United States Patent
Strohm

(10) Patent No.: US 8,289,184 B2
(45) Date of Patent: Oct. 16, 2012

(54) WIRELESS SENSOR NETWORK

(75) Inventor: Charles Fred Strohm, Jenks, OK (US)

(73) Assignee: Murphy Industries, LLC, Tulsa, OK (US)

( * ) Notice: Subject to any disclaimer, the term of this patent is extended or adjusted under 35 U.S.C. 154(b) by 817 days.

(21) Appl. No.: 12/425,829

(22) Filed: Apr. 17, 2009

(65) Prior Publication Data

US 2010/0054307 A1  Mar. 4, 2010

Related U.S. Application Data

(60) Provisional application No. 61/092,228, filed on Aug. 27, 2008.

(51) Int. Cl.
*G08B 1/08* (2006.01)
(52) U.S. Cl. .................................. 340/870.07
(58) Field of Classification Search .............. 340/870.07
See application file for complete search history.

(56) References Cited

U.S. PATENT DOCUMENTS

| | | | |
|---|---|---|---|
| 6,124,806 A | 9/2000 | Cunningham et al. | |
| 6,735,630 B1 * | 5/2004 | Gelvin et al. | 709/224 |
| 6,784,802 B1 | 8/2004 | Stanescu | |
| 6,901,066 B1 * | 5/2005 | Helgeson | 370/348 |
| 7,061,398 B2 | 6/2006 | Holmes et al. | |
| 7,091,854 B1 | 8/2006 | Miao | |
| 7,119,676 B1 | 10/2006 | Silverstrim et al. | |
| 7,142,107 B2 * | 11/2006 | Kates | 340/539.1 |
| 7,492,726 B2 | 2/2009 | Gandham et al. | |
| 7,873,380 B2 * | 1/2011 | Miyazaki et al. | 455/522 |
| 7,893,828 B2 * | 2/2011 | Kates | 340/539.14 |
| 7,936,264 B2 * | 5/2011 | Kates | 340/539.22 |
| 7,982,602 B2 * | 7/2011 | Kates | 340/539.22 |
| 7,986,701 B2 * | 7/2011 | Kore et al. | 370/401 |
| 2003/0016142 A1 | 1/2003 | Holmes et al. | |
| 2003/0025612 A1 | 2/2003 | Holmes et al. | |
| 2005/0210340 A1 | 9/2005 | Townsend et al. | |
| 2005/0213548 A1 | 9/2005 | Benson et al. | |
| 2005/0275528 A1 | 12/2005 | Kates | |
| 2006/0103534 A1 | 5/2006 | Arms et al. | |

(Continued)

FOREIGN PATENT DOCUMENTS

WO  WO0070572  11/2000

(Continued)

OTHER PUBLICATIONS

European Patent Office PCT International Search Report, International Application PCT/US2009/048925, mailed Nov. 19, 2009.

(Continued)

*Primary Examiner* — Adi Amrany
(74) *Attorney, Agent, or Firm* — Fellers, Snider, Blankenship, Bailey & Tippens, P.C.

(57) ABSTRACT

A system for event monitoring is disclosed. The system includes a remote sensor, a remote transceiver interfaced to the remote sensor, and a base transceiver that selectively wirelessly communicates with the remote transceiver. The remote transceiver provides a periodic communication to the base transceiver that is indicative of a nominal operating condition and the periodic communication is acknowledged by the base transceiver.

16 Claims, 4 Drawing Sheets

| U.S. PATENT DOCUMENTS | | |
|---|---|---|
| 2007/0129011 A1 | 6/2007 | Lal et al. |
| 2007/0209865 A1 | 9/2007 | Kokosalakis et al. |
| 2007/0211681 A1 | 9/2007 | Sun et al. |
| 2008/0027586 A1 | 1/2008 | Hern et al. |
| 2008/0040509 A1 | 2/2008 | Werb et al. |
| 2009/0002134 A1 | 1/2009 | McAllister |
| 2009/0009340 A1 | 1/2009 | Weaver et al. |
| 2009/0088605 A1 | 4/2009 | Ross et al. |
| 2009/0119243 A1 | 5/2009 | Yuan et al. |
| 2009/0141899 A1 | 6/2009 | Huang et al. |

| FOREIGN PATENT DOCUMENTS | | |
|---|---|---|
| WO | WO 0101366 | 1/2001 |

OTHER PUBLICATIONS

European Patent Office PCT Written Opinion of the ISA, International Application PCT/US2009/048925, mailed Nov. 19, 2009.

* cited by examiner

WIRELESS SENSOR NETWORK

CROSS REFERENCE TO RELATED APPLICATIONS

This application claims the priority of U.S. Provisional Patent Application No. 61/092,228 entitled "WIRELESS SENSOR NETWORK," filed Aug. 27, 2008, the contents of which are hereby incorporated by reference.

FIELD OF THE INVENTION

This disclosure relates to wireless sensing networks in general and, more specifically, to wireless sensor networks operating in real time.

BACKGROUND OF THE INVENTION

Electronic control systems are utilized in a wide variety of applications requiring a rapid response time to various inputs. In some cases, the inputs may represent a binary input (i.e., on or off, presence of absence of a material, etc.) or may be a digital value or analog voltage representing a possible range of values (i.e., temperature, capacity, etc.)

The various inputs may be collected and provided to an engine controller or other device. The values collected may be the basis of computations or logical decisions resulting in adjustment of operating parameters or even activation or deactivation of various parts of the system. In the case of the engine controller, for example, there is a need for the sensor values to be collected very quickly since engines and the devices they power may be operating at high speed or under other extreme conditions.

One way to connect the various sensors to the engine controller or other logic device is by physically wiring the sensors to the device. The sensors may be wired on a common bus, for example, and be polled by the logic device. As might be imagined, one problem with this arrangement is physical wiring is required to travel from each sensor to the logic device. If new sensors are added, new wiring must also be added. Furthermore, physical wiring can be subject to damage from the elements, vibrations, etc.

What is needed is a system and method for addressing the above, and related, issues.

SUMMARY OF THE INVENTION

The invention of the present disclosure, in one aspect thereof, comprises a system for event monitoring. The system includes a remote sensor, a remote transceiver interfaced to the remote sensor, and a base transceiver that selectively wirelessly communicates with the remote transceiver. The remote transceiver provides a periodic communication to the base transceiver that is indicative of a nominal operating condition and the periodic communication is acknowledged by the base transceiver.

In some embodiments the periodic communication is a packet based communication and may be frequency shift key (FSK) encoded. In some embodiments, the periodic communication has a frequency chosen based on a frequency hopping spread spectrum (FHSS) protocol.

The remote transceiver may operate in a first fail safe mode when the periodic communication acknowledgement is not received by the remote, the first fail safe mode comprising changing a channel for receiving the acknowledgement and retransmitting the periodic communication at a higher power than the first transmission of the periodic communication.

The remote may also operate in a second failsafe mode when the acknowledgement is not received in the first failsafe mode, the second failsafe mode comprising changing the channel for receiving the acknowledgement and retransmitting the periodic communication on a plurality of channels. A third failsafe mode may be used when the acknowledgement is not received in the second failsafe mode, the third failsafe mode comprising changing the channel for receiving the acknowledgement, completing a delay cycle, and transmitting the periodic communication at a higher power than the first transmission of the periodic communication and one a plurality of channels.

In response to a sensor event, the remote transceiver may immediately transmit to the base transceiver, a packet based communication indicative of a sensor event. The packet based communication indicative of a sensor event may be transmitted on a default channel monitored by the base transceiver or on a plurality of channels. The packet based communication indicative of a sensor event may be transmitted via a frequency shift keying (FSK) on a spread spectrum.

DETAILED DESCRIPTION OF THE PREFERRED EMBODIMENTS

Figure 1:
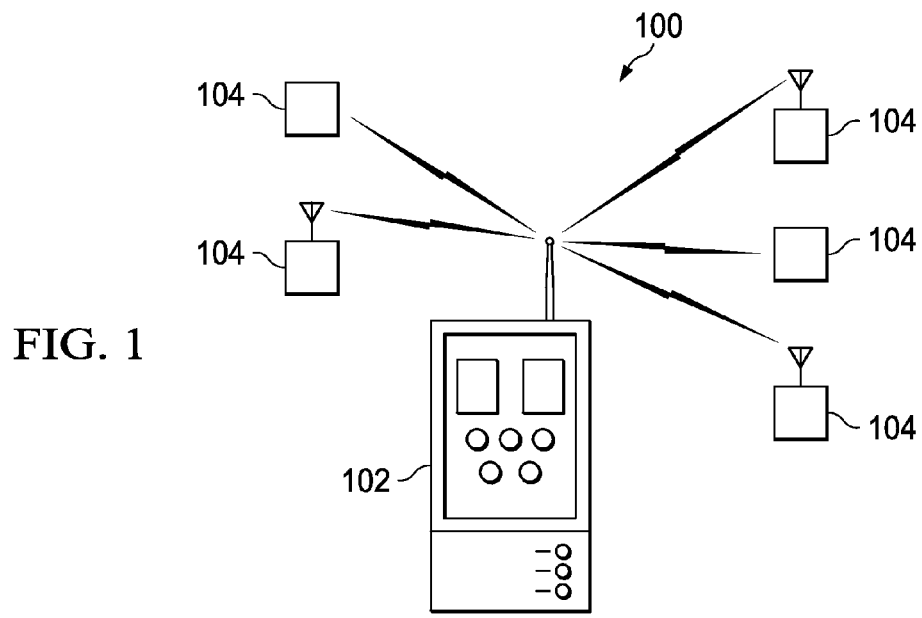
FIG. 1 is a diagram of the network topology of the system of the present disclosure.

Referring now to FIG. 1, a diagram of the network topology of the system of the present disclosure is shown. In the present embodiment, the system 100 comprises a hub 102 in selective communication with a number of remotes 104. It can be seen that the present embodiment employs a "star" network topology with a single hub 102 in communication with a plurality of remotes 104. In the present embodiments, the hub 102 and remotes 104 communicate wirelessly. In one embodiment, frequency shift keying (FSK) or Gaussian Frequency Shift Keying (GFSK) will be utilized on the 900 mHz or 2.5 gHz industrial, scientific and medical (ISM) band. Frequency Hopping Spread Spectrum (FHSS) or Direct Sequence Spread Spectrum (DSSS) may also be utilized to increase the reliability of the system 100. In the present embodiment, each of the remotes 104 selectively communicates with the hub 102, and all communication occurs via and through the hub 102. Therefore, in the present embodiments, the remotes 104 do not communicate directly with each other.

Figure 2:
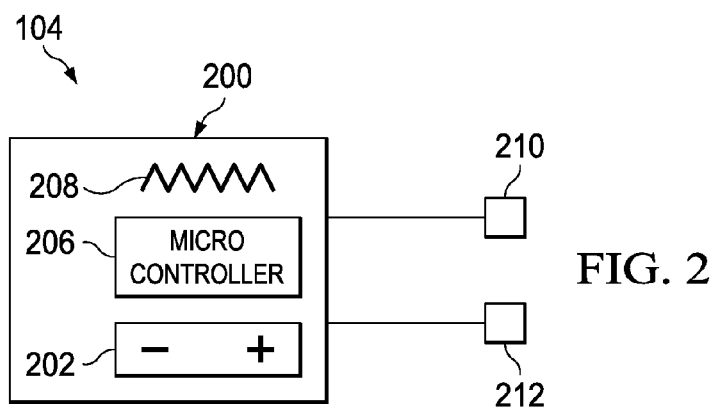
FIG. 2 is a schematic diagram of a remote transceiver with attached sensors.

Referring now also to FIG. 2, a schematic diagram of a remote transceiver with attached sensors is shown. The remote 104 illustrated in FIG. 2 may be constructed based on a printed circuit board 200. In some embodiments, an enclosure will also be provided (not shown in FIG. 2) or the remote 104 may be entirely contained within a sensor. A power supply 202 may also be provided to allow for untethered remote operation. In one embodiment, the power supply 202 will be a replaceable battery. However, rechargeable batteries or other power supplies could also be used in the present embodiment. A micro controller 206 implements and controls the functions and operations of the remotes described herein in the present embodiment. The micro controller 206 can be a general purpose micro processor programmed according to the needed functionality, but could also be an application-specific integrated circuit (ASIC), a field programmable gate array (FPGA), or other computational device.

The embodiment of FIG. 1 provides an internal antenna 208 that is situated directly on the printed circuit board 200. This allows the remote 104 to be completely enclosed within an enclosure for increased durability and/or resistance to the elements. However, in some cases, and as is shown in FIG. 1, the remote 104 has an external antenna in order to increase the reception or broadcast range of the remote. In the present embodiment, the remote 104 of FIG. 2 interfaces with two sensors 210 and 212. It is understood that, in some cases, a remote may interface only with a single sensor, or may have two or more sensors attached. The sensors 210, 212 may be discreet digital input sensors and/or analog type sensors. Based on the sensor 210, 212 and the programming of the micro controller 206, a sensor event can occur by either a discreet input state change and/or by an analog input falling out of bounds.

With regard to the remote 104 as shown in FIG. 2, it is also understood that other electronic devices may be included with the sensor, placed in the enclosure, or attached to the printed circuit board 200. These devices may provide functionality for carrying out such duties as recharging the battery 202, signal conditioning and/or amplification for the inputs from the sensors 210, 212, and other functions not carried out by the micro controller 206.

Figure 3:
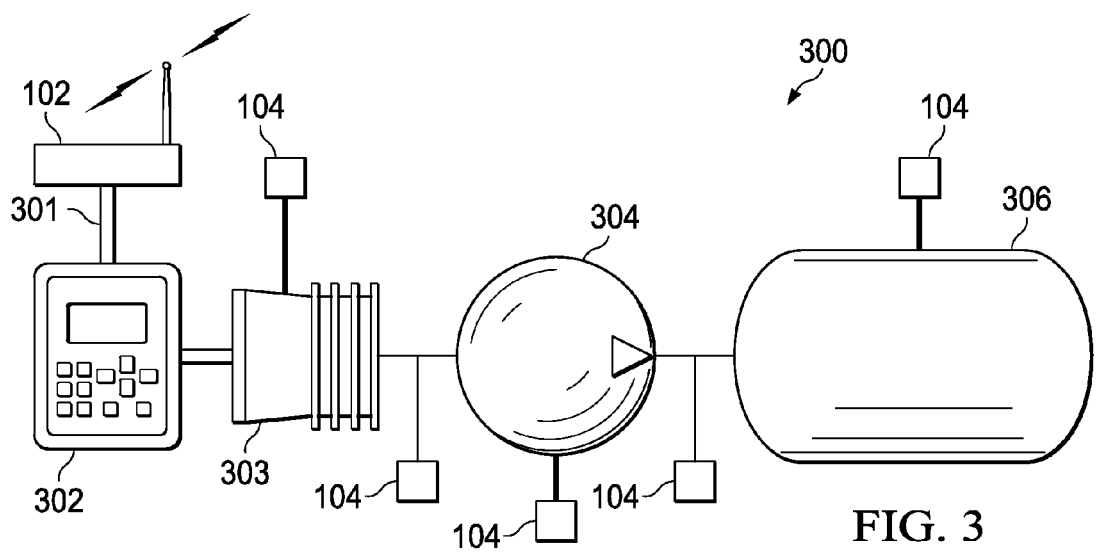
FIG. 3 is a schematic diagram of one embodiment of the system of the present disclosure in conjunction with a compressor system.

Referring now to FIG. 3, a schematic diagram of one embodiment of the system of the present disclosure is shown in conjunction with a compressor system. Here, the hub 102 is shown in a slightly different form factor from that shown in FIG. 1. The hub 102 of FIG. 3 is connected via a MODBUS 301 to an electronic engine controller 302. Although a MODBUS communications interface 301 is used in the present embodiment, it is understood that other interfaces could also be utilized. The hub 102 is also shown as a separate piece of equipment from the engine controller 302, but in some embodiments the two components could be enclosed in the same housing or even operated on the same hardware.

The engine controller 302 is responsible for operation of the engine 303. The engine controller 302 may be a Centurion or Millennium engine controller from FW Murphy, or another controller. The engine 303 may be electric, air powered, or may be an internal combustion engine that provides power for a compressor 304. Various parameters regarding the operation of the engine, including but not limited to temperature, engine speed, engine load, fuel level, and compression may be needed by the engine controller 302 to properly operate the engine 303. Therefore, one or more remotes 104 may be connected as shown, or in other configurations, to the engine 303 and/or its connection to the compressor 304.

The compressor 304 may be a gas compressor or other machine, such as a pump, deriving its power from the engine 303. The compressor 304 may also have a remote 104 connected thereto in order to monitor compressor parameters such as displacement, volume, and/or compression, among others. The output from the compressor 304 leading to the tank 306 may also be provided with a remote 104. Similarly, the pressure, volume, or other parameters relating to the tank 306 may be monitored by another attached remote 104.

As described previously, the remotes 104 may each selectively communicate with the hub 102. Likewise, the hub 102 may communicate back with the various remotes 104. In this manner, it can be seen that the hub 102 and remotes 104 each have transceiving capabilities. In the present embodiment, the 900 MHz or 2.5 GHz ISM band will be used, but in other embodiments other available frequency or spectra could be utilized. The remotes 104 and hub 102 may communicate by digital methods such as frequently shift keying or other encoding schemes. Spread spectrum techniques (FHSS, DSSS) may be utilized to increase reliability of the system 300.

As described, the sensors 104 may each monitor one or more parameters according to a digital or analog sensor interconnected with the system 300. However, in some cases, a relatively long period of time may pass before a sensor event is recorded or transmitted by the remotes 104. The present embodiment provides for "heart beat" monitoring to address this and other issues. In the present system, each of the remotes 104 will periodically transmit a "heart beat" signal to the hub 102. This allows the hub 102 to ensure that a remote is operational, even though no sensor event is being reported. A length of time since the last "heart beat" from a given remote that is determined to be outside operational requirements 104 may itself be cause to take action, as it could be a sign that the remote 104 has lost power and/or malfunctioned.

When not actively transmitting, the remotes 104 may be operated in a low power state. The low power state may be sufficient to allow for monitoring of any attached sensors while still conserving power by powering down transceiving functions.

If an actual event or sensor failure is detected by the remote and transmitted to the hub 102, such information may be communicated to the engine controller 302 via the MODBUS 301 in order to allow the engine controller 302 to take appropriate action. For example, if a failure of the compressor 304 is detected by one or more of the remotes 104, this information may be communicated to the hub 102 and passed on to the engine controller 302. In this example, the engine controller 302 may shut down the engine 303 to prevent further damage to the compressor 304. In another example, a low pressure indication in the tank 306 may signal the engine controller to activate the engine 303 and the compressor 304. A high reading of pressure from the tank 306 may cause the engine controller 302 to lower engine speed or stop the engine 303.

Figure 4A:
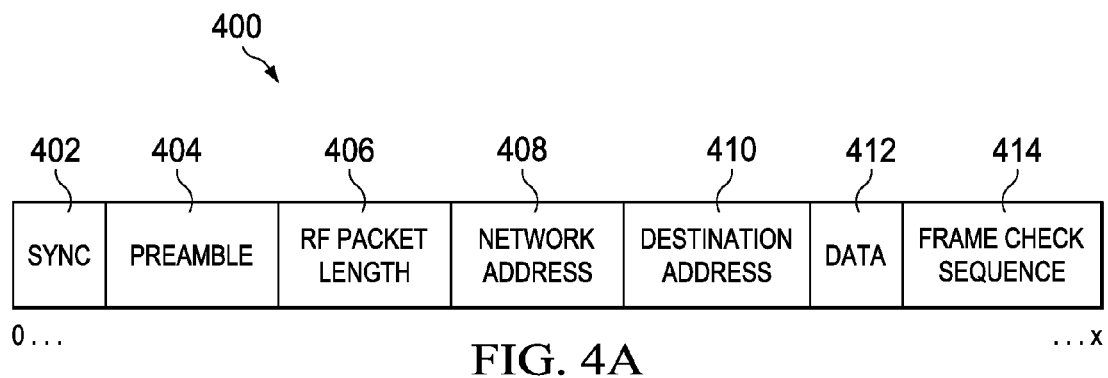
FIG. 4 is an illustration of a data packet format.

In some embodiments, the communication between the remotes 104 and the hub 102 may be a packet based communication. Referring now to FIG. 4, an illustration of an exemplary data packet format is shown. It is understood that the data packet 400 is merely an example and other packet formats based on known protocols or protocols created specifically for the system of the present disclosure could also be utilized. In the present example, the packet 400 is a Level 1 Data Driver Level packet. It can be seen that the packet 400 comprises a number of bits labeled 0 through X. In this case, X is the total number of bits in a fixed width packet.

A sync field 402 may be provided that may be a series of alternating zeros and ones allowing for the receiver of the packet 400 to obtain a lock on the wireless signal. In this embodiment, the sync field may be thought of as a training sequence for the receiving transceiver. This may allow the built in clock recovery circuit of the transceiver to recover the clock signal necessary to decode the remainder of the packet 400. Following the sync field 402 may be a preamble 404 to indicate the start of the actual data in the packet. Following the preamble 404 in the present embodiment is an RF packet length field 406. This field identifies the number of valid data bytes in the packet 400.

In some embodiments, the packet 400 will also contain a network address field 408. This may be used to identify the network to which the data packet 400 belongs. In this way, if the transceiver encounters a packet having an incorrect network address, it may be discarded. This allows multiple systems to operate within the same vicinity. Similarly, a destination address field 410 may be utilized to identify the actual transceiver that is the intended recipient of the data packet 400. Using a combination of the network address field 408 and the destination address field 410, each transceiver within the system 300, whether it is the hub 102 or one of the remotes 104, can engage in communications.

A data field 412 will contain the actual command or information sent in the packet 400 to or from the associated transceiver. If the packet 400 is being sent by a remote 104, the command or data could correspond to a sensor reading or an alarm condition, for example. Finally, a frame check sequence field 414 may be provided to confirm that the data packet has been transmitted without being corrupted. In one embodiment, the frame check sequence may be based upon a cyclic redundancy check or another method of error detection and/or correction.

Figure 4B:
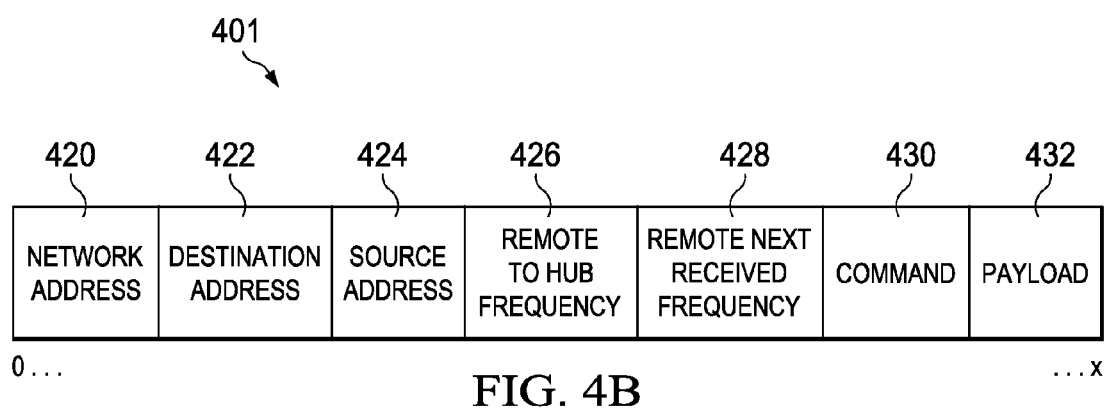

Referring now to FIG. 4B, a Level 2 Data application level packet 401 is illustrated. In the present embodiment, this application level data packet 401 may be based upon the data field and other fields contained in the Level 1 or driver level packet 400. As can be seen, the packet 401 comprises a plurality of fields and will be a specified number of bits long, labeled 0 through X on the packet 401. On the application level, a network address field 420 is provided, as is a destination address 422 and a source address 424. However, on the application level, the data packet 401 may also be said to contain a remote to hub frequency field 426. In the present embodiment, this field is used by the hub to calculate a time delay before replying to the remote when the remote is transmitting on all available channels. The remote's next received frequency may be identified in the remote next received frequency field 428. A command field 430 may be provided that identifies to the receiving transceiver how a payload field 432 is to be processed. The Level 1 packet 400 and the Level 2 packet 401 in the previous figures together illustrate one method of packetizing data and communications between the transceivers, or between the hub 102 and the various remotes 104. It is understood that this is only exemplary and that many other packetizing systems could be utilized. Furthermore, it is possible that packets used on both Level 1 and Level 2 could contain fields not shown in FIGS. 4A and 4B or may not contain all those fields that are shown.

Figure 5:
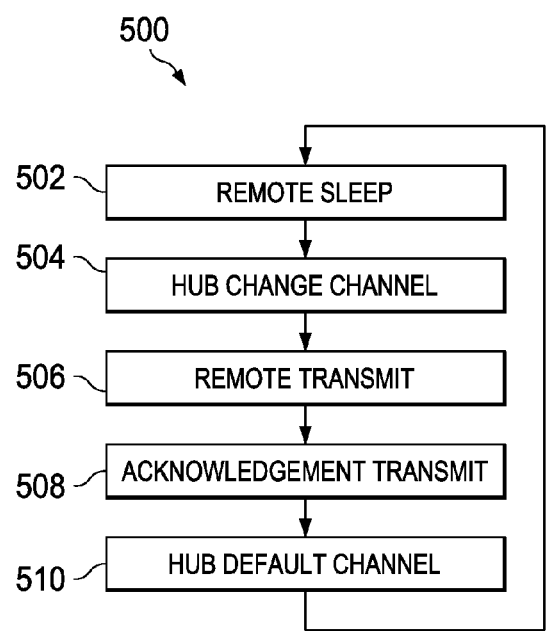
FIG. 5 is a flow diagram illustrating normal operations for one embodiment of remote according the present disclosure

Referring now to FIG. 5, a flow diagram illustrating normal operations for one embodiment of a remote according to the present disclosure is shown. During normal operation, the remote may be in a sleep or low power state 502. When a remote is in a sleep state, the associated hub will have its transceiver set to a default channel. A hub can be programmed with more than one default channel and may select the appropriate one based upon extant RF conditions in the operating area.

Before the associated remote changes from a sleep state, the hub will change to the channel associated with the particular remote at step 504. At step 506, the remote will transmit the data packet corresponding to the current event one or more times and then return to a receive mode. In one embodiment, the hub will know which channel to monitor for the transmission from the remote because it will have previously sent information to the remote indicating which channel and time to transmit on. In turn, the hub will know the correct channel to return an acknowledgement based upon the data received from the remote.

At step 508, the hub will transmit an acknowledgement (ACK). The acknowledgement packet may be transmitted a number of times and may also contain a hub-determined transmit and receive channel that will be used by the remote for the next transmission based upon the frequency hopping spread spectrum pseudo random channel scheme. Following the transmittal at step 508, the hub will return to the default channel at step 510. Following this, the remote may return to a sleep state at step 502, and wait for the next transmittal event.

As previously described, not every packet transmittal from a remote will correspond to a sensor event. For example, in the flow diagram just described, both the remote and hub must both already be aware of the time and channel in order for the hub to adjust to the correct channel at step 504. Thus, the flow diagram 500 may be thought of as illustrating the normal operation for a remote reporting a "heart beat" packet. However, in the event of a data packet being generated and sent based upon a sensor event, the event must be received within a time period supporting real time operation. Since the remotes 104 communicate with the hub 102 wirelessly, the possibility exists that the RF packet reporting of the event will not be received by the hub. Thus, the remote may need to re-transmit the packet to the hub until the hub acknowledges receipt. In one embodiment, a number of fail safe steps may be implemented to ensure the proper throughput of data on the RF channels.

It will be appreciated that, in the event of an actual sensor event, the remote may inform the hub by transmitting on the default channel. The corresponding data packet may be transmitted a number of times and may include the channel upon which the remote will be listening for an acknowledgement from the hub. The acknowledgement may also contain the next set of transmitted receive channels to be utilized by the remote. However, the communication may not always go according to plan, which will lead to implementation of the fail safe operation.

Figure 6:
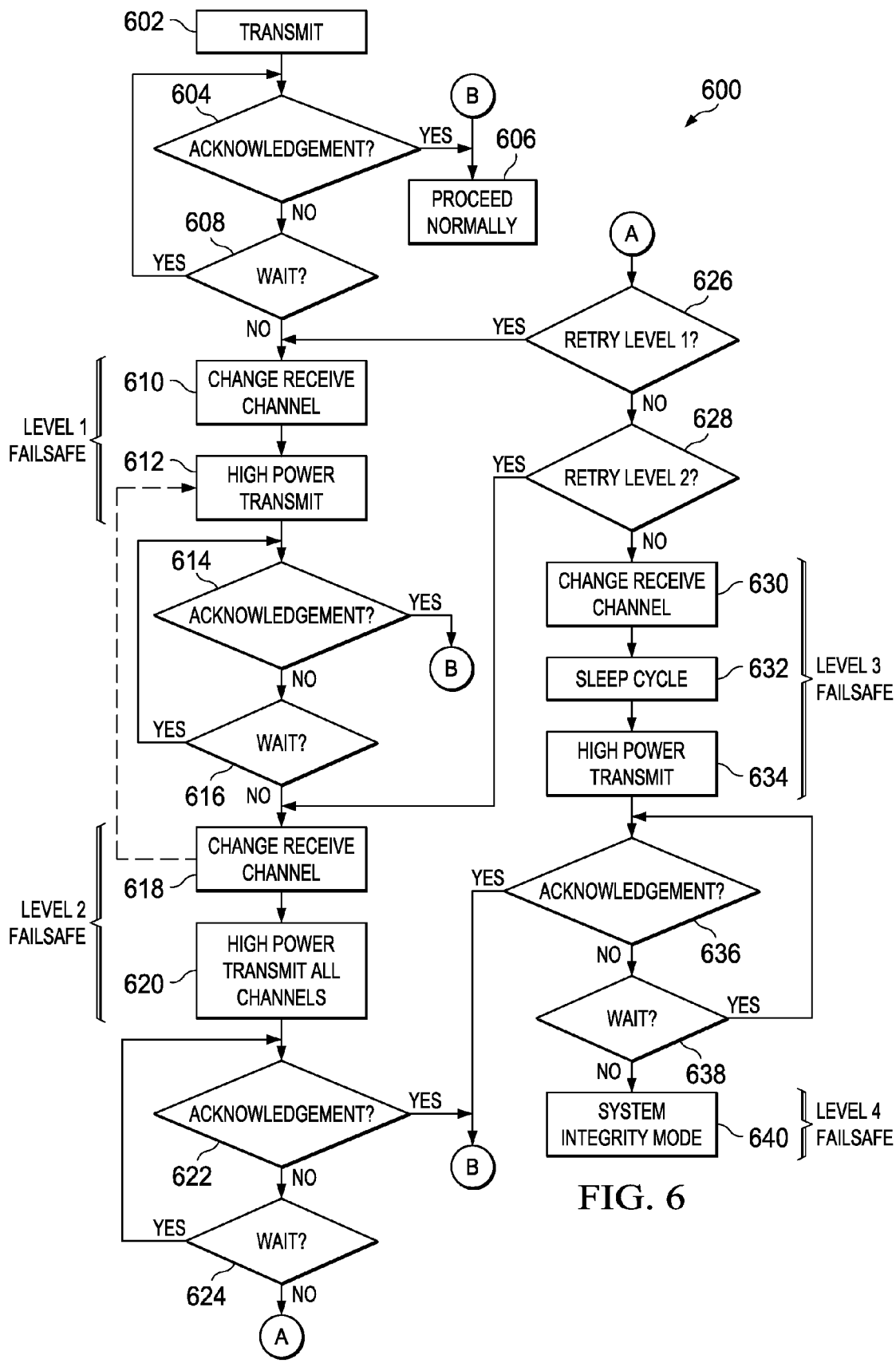
FIG. 6 is a flow diagram illustrating a fail safe mode of operation for one embodiment of a remote according to the present disclosure.

Referring now to FIG. 6, a flow diagram illustrating a fail safe mode of operation for one embodiment of the system of the present disclosure is shown. At step 602, a data packet is transmitted from a remote to the hub. For the present example, assuming this is in response to a sensor event, following transmission of the packet at step 602, the remote will initiate a time-out sequence. The purpose of the time-out sequence is to wait for receipt of an acknowledgement packet (ACK) from the hub, as shown at step 604. If the acknowledgement is received at step 604, then at step 606 the sequence proceeds normally, as illustrated in the previous flow diagram. In the event that an acknowledgement is not received at step 604, the remote will continue to wait at step 608 so long as a predetermined time limit has not passed.

When the determination has been made that it is no longer feasible to continue waiting for the acknowledgement, at step 608 the process will proceed to a Level 1 Failsafe comprising steps 610 and 612 as shown in the flow diagram. At step 610, the remote may change its receive channel to the next channel in the frequency hopping spectrum pseudo random sequence. This may be to attempt to overcome interference on the current channel. The information corresponding to the next channel is available to both the hub and the remote because the data is contained in the packet originally transmitted by the remote to the hub. At step 612, the remote may transmit on high power and will retransmit the original packet, possibly at high power. The remote may transmit the packet to the hub a number of times at this step. Following this, the remote will return to its default power state and wait, as shown in steps 614 and 616, to determine whether the acknowledgement is received. If the acknowledgement is received at step 614, the procedure will return to normal at step 606. If the acknowledgement is not received at step 614, at step 616 the decision is made as to whether or not the remote will continue to wait to receive the acknowledgement.

At some point, if the acknowledgement is never received and the decision is made at step 616 not to wait any longer, the remote will move to a Level 2 Failsafe comprising steps 618 and 620. At step 618, the remote may change its receiver channel to the next channel in the FHSS pseudo random sequence (or in the DSSS). In some embodiments, the Level 1 Failsafe technique may be retried, as illustrated by the dotted line from step 618 to step 612. In this embodiment, the high power transmission technique may be tried on the default channel one or more additional times. However, in the present embodiment, following the changing of the channel at step 618, the remote may change to a high power transmission mode and may transmit the data packet on all available channels at step 620. In some embodiments, a plurality of predetermined channels may be used less than all the available channels. This is in contrast to the level one technique of transmitting at high power on the default channel.

Following transmission of the data packet at high power on all channels at step 620, the remote will once again power back to its default mode and begin the time-out sequence that includes waiting for the acknowledgement at steps 622 and 624. If, at step 622 an acknowledgement is received, then control resumes normally at step 606. However, if the acknowledgement is not received within a sufficient period of time, the decision may be made at step 624 to move to the decision at step 626 as to whether or not to retry the Level 1 Failsafe. If, at step 626 the Level 1 Failsafe if retried, then the procedure is started again at step 610. If the decision is made at step 626 not to retry Level 1, retrying Level 2 may also be considered at step 628. If Level 2 is to be retried, flow control returns to step 618.

If the decision is made to retry neither Level 1 nor Level 2, then control may proceed to a Level 3 Failsafe mode. If the technique reaches this point, it means that there was no acknowledgement received from the hub after trying various modes of communication. Once again, at step 630, the receive channel may be changed. A delay cycle for a specified period of time may be initiated at step 632 to allow RF conditions to improve or another high power transmit technique may be tried at step 634. After the predetermined delay cycle of step 632, followed by the high-power transmission sequence of step 634, the remote will await an acknowledgement at steps 636 and 638. If, at step 636, acknowledgement is received, control proceeds normally at step 606.

If the decision is made at step 638 not to continue waiting for the acknowledgement, then control proceeds to a system integrity mode at step 640. The system integrity mode may contain additional steps and procedures to continue to attempt to communicate and receive acknowledgement from the hub at the remote. This step may be designed based upon how critical the remote is to system performance.

Figure 7:
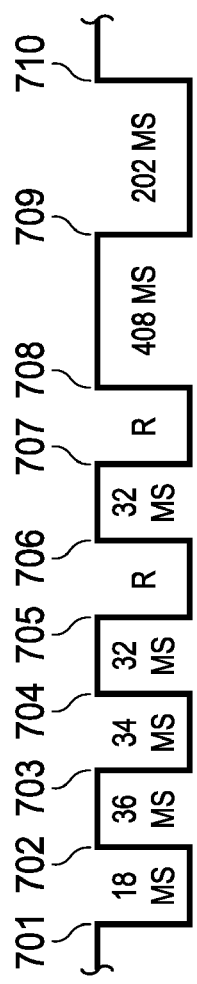
FIG. 7 is a timing diagram illustrating one method of implementing a failsafe routine for heartbeat communications according to the present disclosure.

FIG. 7 is a timing diagram illustrating one method of implementing a failsafe routine for heartbeat communications according to the present disclosure. This or a similar method may be utilized at one or more of the various failsafe levels described above. Each time a remote of the present system transmits a heartbeat packet, the channel that the remote itself is listening will be incremented to the next channel is its rotation. The information corresponding to the channel sequence for the remote is also transmitted to the hub in each heartbeat packet. In this way, if the listening channel becomes blocked or otherwise subject to unacceptable interference, the remote and the hub will both be able to utilize the next listening channel.

At event 701 the remote wakes up. In the present example, the wakeup corresponds to a timed event indicating that the next heartbeat packet should be transmitted to the hub. It will be appreciated that the present system provides a mechanism (for heartbeat transmissions or event related transmissions) for the remotes of the present system to initiate communications with the hub. This circumvents the need for a polling system or a strictly timed system. Among other benefits, this leads to lower power consumption and greater flexibility.

A warm-up delay of about 36 ms before the remote starts transmitting may be present as shown at event 702. At 703 the heartbeat packet is transmitted. Event, 704 marks the beginning of a 32 ms timeout period. In some embodiments, under ideal conditions an acknowledgement from the hub can be expected 11-12 ms into the 32 ms timeout period. If no acknowledgement is received, a high priority channel is used to transmit the heartbeat packet at step 705. In the present embodiment, a delay period of between 22 and 52 ms passes between events 705 and 706. However, another timeout of about 32 ms will begin at step 706. A second high priority channel may be tried at step 707, followed by another random delay of 22-52 ms, and another 32 ms timeout at step 708.

If no acknowledgement has been received up to this point, a much longer timeout may be utilized before proceeding to the next step. Thus, in FIG. 7, a 408 ms timeout is shown between events 708 and 709. Step 709 is a transmit sweep where the heartbeat packet is transmitted across a plurality of channels. The channels chosen may be random, may include all available channels, or may be a set of channels selected to provide the greatest chance for success. Regardless of which channel, if any, is ultimately successful in reaching the hub, a minimum reply time would once again be 11 ms into the timeout period. However, a longer delay period of about 202 ms may be used at 710 before further steps may be tried, or it may be considered that a catastrophic failure has occurred.

Figure 8A:
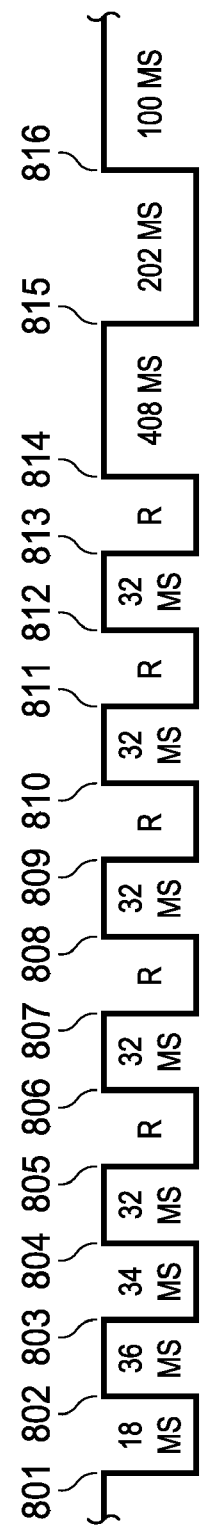
FIGS. 8A and 8B are two timing diagrams corresponding to one method of implementing a failsafe routine for sensor event communications according to aspects of the present disclosure.
Figure 8B:
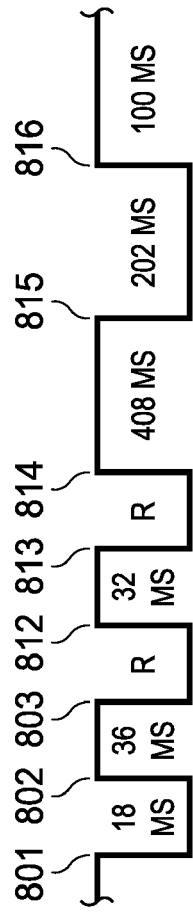

FIGS. 8A-8B are two timing diagrams corresponding to one method of implementing a failsafe routine for sensor event communications according to aspects of the present disclosure. This or a similar method may be utilized at one or more of the various failsafe levels described above. Each time a remote of the present system transmits a sensor event packet, the channel that the remote itself is listening will be incremented to the next channel is its rotation. The information corresponding to the channel sequence for the remote is also transmitted to the hub in each sensor event packet. In this way, if the listening channel becomes blocked or otherwise subject to unacceptable interference, the remote and the hub will both be able to utilize the next listening channel.

FIG. 8A indicates a possible first step that is followed by a remote that has detected a reportable sensor event. Following a wakeup at event 801 and a warm-up delay at event 802, the routine generally is to transmit on a high priority channel as shown by event 803. A timeout is taken at 804 to allow time for the response from the hub. A best-case scenario on the response time is 11-12 ms so the delay is about 32 ms to allow for adequate time to receive an acknowledgement. If no acknowledgement is received, a second high priority channel is tried as shown at event 805. A random delay of between 22 and 52 ms occurs next followed by a programmed timeout of 32 ms at event 806.

This general process described above may repeat a total of three times, meaning that a high priority transmit will have been tried a total of six times. A high priority first channel transmit may occur again at 807, followed by a random delay, then a timeout at event 808. The second high priority may be tried again at 809, followed by a random delay, then a timeout at event 810. Finally, the first high priority channel may be tried again at 811, followed by a random delay, and a timeout at 812. The second high priority channel may be tried a final time at step 813, followed by the random delay, then a timeout at event 814. However, this last timeout is much longer and may last for about 408 ms. Following the 408 ms timeout at event 814, a transmission of the sensor event packet will be tried on all available channels at 815. Following this, a timeout period of about 100 ms may begin at event 816.

In the event that the process shown in FIG. 8A is ultimately unsuccessful, the failsafe mode of FIG. 8B may be employed. In contrast to the mode of FIG. 8A, the failsafe mode of FIG. 8B may repeat until an acknowledgement is received, or the remote enters a low power mode on the assumption that no acknowledgement is going to be received. It can be seen from FIG. 8B that an abbreviated process may be used for the failsafe mode. A wakeup at event 801 and a delay at event 802 may be present. At event 803, the first high power transmit channel may be utilized, followed by a random 22-52 ms delay, and a timeout period of 32 ms at event 812. Event 813 shows the second high power channel being utilized, followed by the random delay, and the timeout of event 814. The timeout of 814 is 408 ms, followed at event 815 by a high power transmit on all channels event. A 100 ms timeout follows at event 816, whereupon the process may repeat, starting at event 801.

The various random delays referenced above are related to network traffic when multiple remotes 104 are utilized with a single hub 102—as will often be the case. When a packet is sent from the remote 104 to the hub 102, it is possible that the channel on which the remote 104 is expecting a reply from the hub 102 is blocked. Given this possibility, the remote 104 changes its receive channel each time a packet is sent to the hub 102. This is important when the remote 104 re-transmits a packet to the hub 102. This delay is important in the event two or remotes 104 try to transmit at the same time. By randomizing delays the remotes 104 are prevented from continually interfering with one another, which could lead to system failure.

It should also be noted that while the remote 104 is transmitting a sensor event packet, it tracks internally the number of times the packet has been transmitted. This data becomes part of the packet when transmitted so that the hub 102, and the user of the system, will be able to discern how many attempts were required before hub 102 was alerted to the sensor event.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A system for event monitoring, comprising:
 a remote sensor;
 a remote transceiver interfaced to the remote sensor; and
 a base transceiver that selectively wirelessly communicates with the remote transceiver;
 wherein the remote transceiver provides a periodic communication to the base transceiver that is indicative of a nominal operating condition and the periodic communication is acknowledged by the base transceiver; and
 wherein the remote transceiver operates in a first fail safe mode when the periodic communication acknowledgement is not received by the remote transceiver, the first fail safe mode comprising changing a channel for receiving the acknowledgement and retransmitting the periodic communication at a higher power than the first transmission of the periodic communication.

2. The system of claim 1, wherein the periodic communication is a packet based communication.

3. The system of claim 2, wherein the periodic communication is frequency shift key (FSK) encoded.

4. The system of claim 3, wherein the periodic communication has a frequency chosen based on a frequency hopping spread spectrum (FHSS) protocol.

5. The system of claim 1, wherein the remote transceiver operates in a second failsafe mode when the acknowledgement is not received in the first failsafe mode, the second failsafe mode comprising changing the channel for receiving the acknowledgement and retransmitting the periodic communication on a plurality of channels.

6. The system of claim 5, wherein the remote transceiver operates in a third failsafe mode when the acknowledgement is not received in the second failsafe mode, the third failsafe mode comprising changing the channel for receiving the acknowledgement, completing a delay cycle, and transmitting the periodic communication at a higher power than the first transmission of the periodic communication and on a plurality of channels.

7. The system of claim 1, wherein, in response to a sensor event, the remote transceiver immediately transmits to the base transceiver, a packet based communication indicative of a sensor event.

8. The system of claim 7, wherein the packet based communication indicative of a sensor event is transmitted on a default channel monitored by the base transceiver.

9. The system of claim 8, wherein the packet based communication indicative of a sensor event is transmitted via a frequency shift keying (FSK) on a spread spectrum.

10. The system of claim 7, wherein the packet based communication indicative of a sensor event is transmitted on a plurality of channels.

11. A system for real-time event monitoring, comprising:
 a plurality of remote transceivers, each connected to at least one sensor, the at least one sensor monitoring a parameter of a monitored system; and
 a base station transceiver in periodic wireless communication with each of the remote transceivers;
 wherein the periodic communications are via a frequency shift key (FSK) encoded frequency hopping spread spectrum (FHSS) and include scheduled heartbeat communications indicative of nominal remote transceiver operation; and
 wherein the failsafe mode comprises retransmitting the heartbeat communication at a higher power than the original transmission.

12. The system of claim 11, wherein each of the scheduled heartbeat communications comprise a single remote transceiver transmitting to the base station transceiver at a predetermined time and on a predetermined channel.

13. The system of claim 11, wherein each of the scheduled heartbeat communications provides from a transmitting remote transceiver to the base station transceiver a channel on which the base station transceiver will provide an acknowledgement communication.

14. The system of claim 13, wherein each of the remote transceivers will operate in a fail safe mode if the acknowledgement from the base station transceiver is not received.

15. The system of claim 14, wherein the failsafe mode comprises retransmitting the heartbeat communication with a second channel on which the base station transceiver will provide the acknowledgement communication.

16. The system of claim 15, wherein the failsafe mode comprises transmitting the heartbeat communication on multiple channels.

* * * * *